July 26, 1932. G. H. McINTYRE 1,869,019
METHOD FOR RECOVERY OF FLUORIDES FROM ENAMEL GLASS SMELTER GASES
Filed May 3, 1928
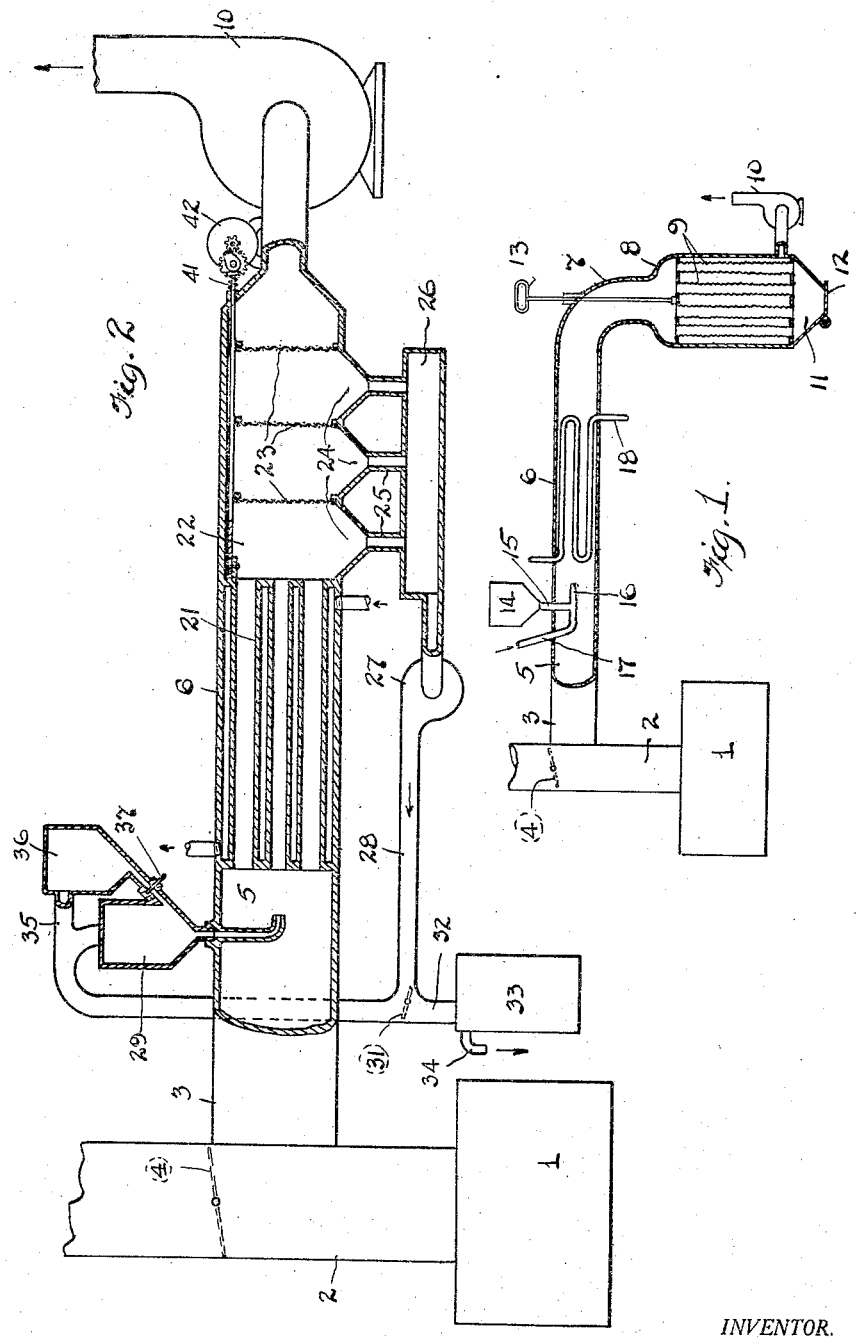
INVENTOR.
Glenn H. McIntyre
BY
Fay, Oberlin & Fay
ATTORNEYS.

Patented July 26, 1932

1,869,019

UNITED STATES PATENT OFFICE

GLENN H. McINTYRE, OF EAST CLEVELAND, OHIO, ASSIGNOR TO FERRO ENAMELING COMPANY, OF CLEVELAND, OHIO, A CORPORATION OF OHIO

METHOD FOR RECOVERY OF FLUORIDES FROM ENAMEL GLASS SMELTER GASES

Application filed May 3, 1928. Serial No. 274,787.

This invention, as indicated, relates to a method and apparatus for the recovery of fluorides from enamel glass smelter gases. More particularly it has in view the conversion of silicon tetra-fluoride and boron trifluoride carried in the waste gases produced in the course of the manufacture of enamel glass, enamel glaze frit, porcelain, china, and the like, into non-volatile solid fluoride products which may be utilized as raw materials in the enamel glass industry.

The particular products recovered depend upon the particular reagents used. It has been found that various alkali metal hydroxides and alkali earth metal oxide and alkaline earth metal hydroxides, as well as certain metallic fluorides, act very effectively in the removal of the gases mentioned. Commercial hydrate of lime has been found particularly satisfactory and comletely absorbs both silicon tetra-fluoride and boron trifluoride. Sodium and potassium carbonates may be used for the recovery of any free hydrofluoric acid gas, but operate less effectively with respect to silicon tetra-fluoride and boron trifluoride. Nickel fluoride may be used but has been found to act very effectively in connection with the removal of boron trifluoride, but is less sensitive with respect to silicon tetra-fluoride. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of the various ways in which the principle of the invention may be used.

In said annexed drawing:

Fig. 1 is a diagrammatic view partly in section illustrating a simple form of apparatus embodying the invention and adapted to carry out the process herein set forth; and Fig. 2 is a similar view of an apparatus provided with means for carrying on the process continuously.

As is clearly shown in the drawing, the smelter 1 for the enamel glass is directly connected with a stack 2, with which a conduit 3, forming part of the recovery apparatus, is connected. A closure 4 is adapted to divert gases from the stack through the conduit. The conduit, as indicated, is provided with a chamber 5 for the introduction of powdered reagents and with a suction 6, through which cooling pipes are passed, which serve to reduce the temperature to a point where the action may be carried on more satisfactorily with respect to the filter bags used in the recovery of the various products. In the form of construction shown in Fig. 1 the conduit is turned downwardly at its far end 7 and is enlarged to provide a chamber 8, within which tubular filter bags 9 are suspended between suitable diaphragms. A suction device 10 is connected adjacent the lower end of the chamber and serves to draw the stack gases through the conduit at the desired rate of speed. A hopper 11 is provided beneath the recovery chamber 8, and a suitable closure 12 at the base of the hopper provides a means for removing the accumulated recovery products. An agitating device comprising a shaker grid 13 is associated with the filter bags, preferably at a central point so that solid material deposited thereon may be shaken free at desired intervals from the surfaces of the filter bags, falling thence into the hopper at the lower end of the chamber. As has been indicated, a portion of the conduit serves as a point for the introduction of the powdered reagents.

This point of introduction may be in advance of the cooling portion of the conduit or may be immediately beyond the cooling chamber. The reactions take place to better advantage with a high degree of heat, but a lowering of the temperature of the gases is necessary to prevent injury to the filter bags.

As is shown in Fig. 1, the point of introduction of the reagent material is in advance of the cooling section of the conduit and comprises a hopper 14 carrying powdered reagents, such as finely divided hydrated lime, having a discharge pipe 15 at the lower end formed with an angularly disposed nozzle 16 with which an air pressure pipe 17 communicates. In this manner powdered reagents in the quantity desired may be blown into the gas stream and there react with the smelter gases to convert the silicon tetra-fluoride and boron trifluoride into a metallic fluoride.

The means for cooling the smelter gases comprises a cold-air pipe 18 provided with a plurality of coils disposed longitudinally within the conduit. The recovered heat from the smelter gases may be utilized for other heating purposes about the plant and at the same time the gases of the smelter may be reduced from a high temperature to a much lower temperature, at which the reaction will take place satisfactorily, but which will not be injurious to the filter bags used to capture the particles of solid material recovered from the smelter gases.

In the form of construction shown in Fig. 2, many of the same elements used in the apparatus shown in Fig. 1 are provided, but the apparatus is arranged for continuous operation. Thus, the cooling section of the conduit 6 may be formed with a plurality of built-in passageways 21, through which the cold air, water, or other cooling element, is circulated to reduce the temperature of the smelter gases. The recovery chamber 22 may be provided with a number of fabric diaphragms 23 of progressively finer mesh. Tubular filter bags may be used if desired instead of diaphragms. Beneath the diaphragms, hoppers 24 are provided, which hoppers terminate in discharge pipes 25 communicating with the recovery product chamber 26. A blower 27 communicates with the end of the recovery product chamber and serves to transfer the product contained therein into a supply pipe 28 which communicates with the hopper 29, from which the reagent is originally supplied to the conduit. A baffle 31 is provided in the supply line at a point where a discharge pipe 32 is joined and serves to divert a portion of the recovery product into a receptacle 33. A relief pipe 34 is provided adjacent the upper end of said receptacle and suitable screens may be provided within the receptacle to prevent loss of the powdered recovery products.

The upper end of the supply line is provided with a branch line 35 adapted to supply pressure to a hopper 36, within which fresh material may be placed. An adjustable valve 37 in the discharge pipe at the base of said hopper 36 serves to regulate the rate of supply of fresh material to the apparatus. Means for agitating the diaphragms at periodic intervals may be provided, that illustrated comprising a frame 41 connected to the upper edge of the diaphragms and adapted to be actuated at periodic intervals by a motor 42.

From the description of the apparatus, it is believed the process to be carried out will be readily understood. This process or method of recovering fluorides from smelter gases comprises the steps of adding a reagent, preferably in powdered or atomized form to the gas stream from the smelter, which is under a sufficient degree of heat to very rapidly carry out the reaction and thereafter cooling the gases to a point where they may be safely passed through filter bags without injuring the same, and thereafter recovering the solid particles of the materials formed through the reaction.

It also includes the carrying out of the process as a continuous operation by returning the recovery products to the original source of supply of the atomized material and reintroducing a portion of such recovery product with fresh material into the smelter gas stream. It also includes the abstraction or "bleeding" of a portion of the recovered product so as to maintain the effectiveness of the reagent, at a suitable point when mixed with an added portion of fresh material to completely absorb the silicon tetra-fluoride and boron trifluoride carried in the smelter gases.

While the preferred method provides for the addition of the powdered reagent before the smelter gases are cooled by the coils, it is to be understood that the reagent may be added to the gas stream after it has been cooled, as there remains sufficient heat in the gas stream to permit the reaction to take place at such point with sufficient rapidity for commercial purposes.

A single passage of the gas through the filter bags serves to remove all of the silicon tetra-fluoride and boron trifluoride. If any free acids, such as nitric acid, or hydrofluoric acid, or oxides of nitrogen, are present, they will be absorbed simultaneously with the other products mentioned. Through this process all of the gases specified are converted into solids. The presence of carbon dioxide, and other acid gases does not interfere with the reaction of the added reagents silicon tetra-fluoride and boron trifluoride.

The reaction takes place very rapidly and, as stated heretofore, a single passage of the gas stream and the alkaline earth oxides or hydroxides through the apparatus will complete the process, with the complete absorption of the gaseous products mentioned.

As has been stated, the reaction may be carried on with the use of calcium hydroxide, calcium oxide, sodium hydroxide, or potassium hydroxide, all of which produce the corresponding non-volatile, solid metallic fluorides and a silica by-product, and also with certain metallic fluorides, particularly nickel fluoride, the resulting product recovered comprising in the last instance a nickel fluo-borate. The hydroxides have been found to be very effective for both the recovery of silicon tetra-fluoride and boron trifluoride, and inasmuch as the calcium hydroxide is cheaper and very much less hygroscopic than the other reagents, its use is preferred where a particular recovery product is not desired. If, however, it is desired to produce some other product, such as nickel fluo-borate, the reaction should be carried on through the use of nickel fluoride.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. A method of producing solid non-volatile fluorides from volatile fluoride gases in the waste gas stream of enamel glass, and enamel glaze frit smelters, or the like, which includes the steps of bringing into contact with said waste gas stream finely divided particles of alkali metal or alkaline earth metal hydroxides, and thereafter separating the resultant non-volatile fluorides from said waste gas stream.

2. A method of producing solid non-volatile fluorides from volatile fluoride gases in the waste gas stream of enamel glass, and enamel glaze frit smelters, or the like, which includes the steps of injecting finely divided particles of alkaline metal compounds into the waste gas stream, and thereafter screening said particles and the converted solid non-volatile fluorides from said waste gas stream.

3. A method of producing solid non-volatile fluorides from volatile fluoride gases in the waste gas stream of enamel glass, and enamel glaze frit smelters, or the like, which includes the steps of bringing into contact with said waste gas stream while at relatively high temperature, finely divided particles of alkaline earth metal compounds, and thereafter cooling said waste gas stream and separating the resultant non-volatile fluorides from said waste gas stream.

4. A method of producing solid non-volatile fluorides from volatile fluoride gases in the waste stream of enamel glass, and enamel glaze frit smelters, or the like, which includes the steps of injecting finely divided particles of alkaline earth metal compounds into the waste gas stream, simultaneously cooling said gases and recovering the heat therefrom, and thereafter screening excess amounts of said reagents and solid fluorides produced by the interaction of said reagents with the volatile fluorides from the waste gas stream at the reduced temperature.

5. A method of producing non-volatile fluorides from silicon tetrafluoride and boron trifluoride carried in the waste gas stream of an enamel glass, or an enamel glaze frit smelter, or the like which includes the step of acting on the smelter gases with calcium hydroxide in powdered form.

6. A method of producing non-volatile fluorides from silicon tetrafluoride and boron trifluoride carried in the waste gas stream of an enamel glass, or an enamel glaze frit smelter, or the like, which includes the steps of acting on the smelter gases with calcium hydroxide in powdered form, and thereafter separating the resultant calcium fluoride, silicic acid and silica from said gas stream.

7. A method of producing non-volatile fluorides from silicon tetrafluoride carried in the waste gas stream of an enamel glass, or an enamel glaze frit smelter, or the like, which includes the step of acting on the smelter gases with calcium hydroxide in powdered form and thereafter separating the resultant calcium fluoride from said gas stream.

8. A method of producing non-volatile fluorides from boron trifluoride carried in the waste gas stream of an enamel glass, or an enamel glaze frit smelter, or the like, which includes the step of acting on the smelter gases with calcium hydroxide in powdered form and thereafter separating the resultant calcium fluoride from said gas stream.

Signed by me this 25th day of April, 1928.

GLENN H. McINTYRE.